May 5, 1959

J. K. VANN, SR., ET AL 2,885,111

PALLET DESTACKING AND FEEDING APPARATUS

Filed April 22, 1957

JAMES K. VANN, SR.
CARL J. LUNKENHEIMER
INVENTORS

BY

ATTORNEY

May 5, 1959  J. K. VANN, SR., ET AL  2,885,111
PALLET DESTACKING AND FEEDING APPARATUS
Filed April 22, 1957  5 Sheets-Sheet 3

JAMES K. VANN, S<sup>R</sup>.
CARL J. LUNKENHEIMER
INVENTORS

BY R.G. Story
ATTORNEY

May 5, 1959 J. K. VANN, SR., ET AL 2,885,111
PALLET DESTACKING AND FEEDING APPARATUS
Filed April 22, 1957 5 Sheets-Sheet 5

JAMES K. VANN
CARL J. LUNKENHEIMER
INVENTORS

BY

ATTORNEY

United States Patent Office 2,885,111
Patented May 5, 1959

2,885,111

PALLET DESTACKING AND FEEDING APPARATUS

James K. Vann, Sr., Columbia, and Carl J. Lunkenheimer, Cayce, S.C., assignors to Swift & Company, Chicago, Ill., a corporation of Illinois Application April 22, 1957, Serial No. 654,149

4 Claims. (Cl. 221—13)

This invention relates generally to an apparatus for automatically feeding pallets. More particularly, this invention relates to an apparatus for maintaining a stack of pallets and automatically removing and conveying individual pallets to a loading station.

Heretofore it has been necessary to utilize a substantial floor area merely for the storage of pallets close to the location at which they are needed. Also, in the past it has been necessary to expend a great deal of effort to position individual pallets for loading. Pallets are normally stored in stacks and later moved to the loading area as they are needed. Generally the lighter type pallets are removed from stacks and positioned by hand; however, with pallets of extremely heavy construction or large size, where it is inconvenient or even impossible for one or two operators to manually position individual pallets, it has been necessary for an operator to employ a fork lift truck to remove the uppermost pallet from a stack and move it to the desired position. In either case, the mere manipulation of empty pallets in preparation for loading has entailed the use of several operators and many pieces of equipment such as fork lift trucks. Therefore, it is a primary object of this invention to provide an automatic apparatus, which may be controlled by one operator, for storing a plurality of pallets and positioning individual pallets at a desired location.

Another object of this invention is to provide automatic apparatus for the positioning of the pallets to be loaded, which reduces both the operations required of fork lift trucks and the number of manual operations.

A further object of this invention is to provide novel means to support a stack of pallets within a hopper and deliver pallets, singly, to an intermittently movable conveyor.

Other important objects and advantages of this invention will be apparent from the description and claims which follow.

In general, this apparatus comprises a vertical hopper in which pallets are stacked. An intermittently operable conveyor is positioned beneath and extends a distance beyond the hopper. A pair of lifting mechanisms comprising a pair of vertically movable lifting forks, pivotally suspended to swing toward and away from the stacked pallets, are positioned on two opposite sides of the hopper to support the stack of pallets above the conveyor. When the apparatus is at rest, one pallet will be supported on the motionless conveyor and the remainder of the stack will be held above it on the forks. When the conveyor is started the pallet will be moved out of the hopper from beneath the stack to a point removed from the hopper such as a loading station. When the conveyor is stopped, the forks are moved downwardly a distance sufficient to rest the stack of pallets on the conveyor and then outwardly from the stack. The motion of the forks is then reversed and as they move upwardly a guide track urges them to swing inwardly so as to engage the next to the lowest pallet and lift the stack from the lowest pallet.

In the drawings where like reference characters signify the same part:

Figure 1:
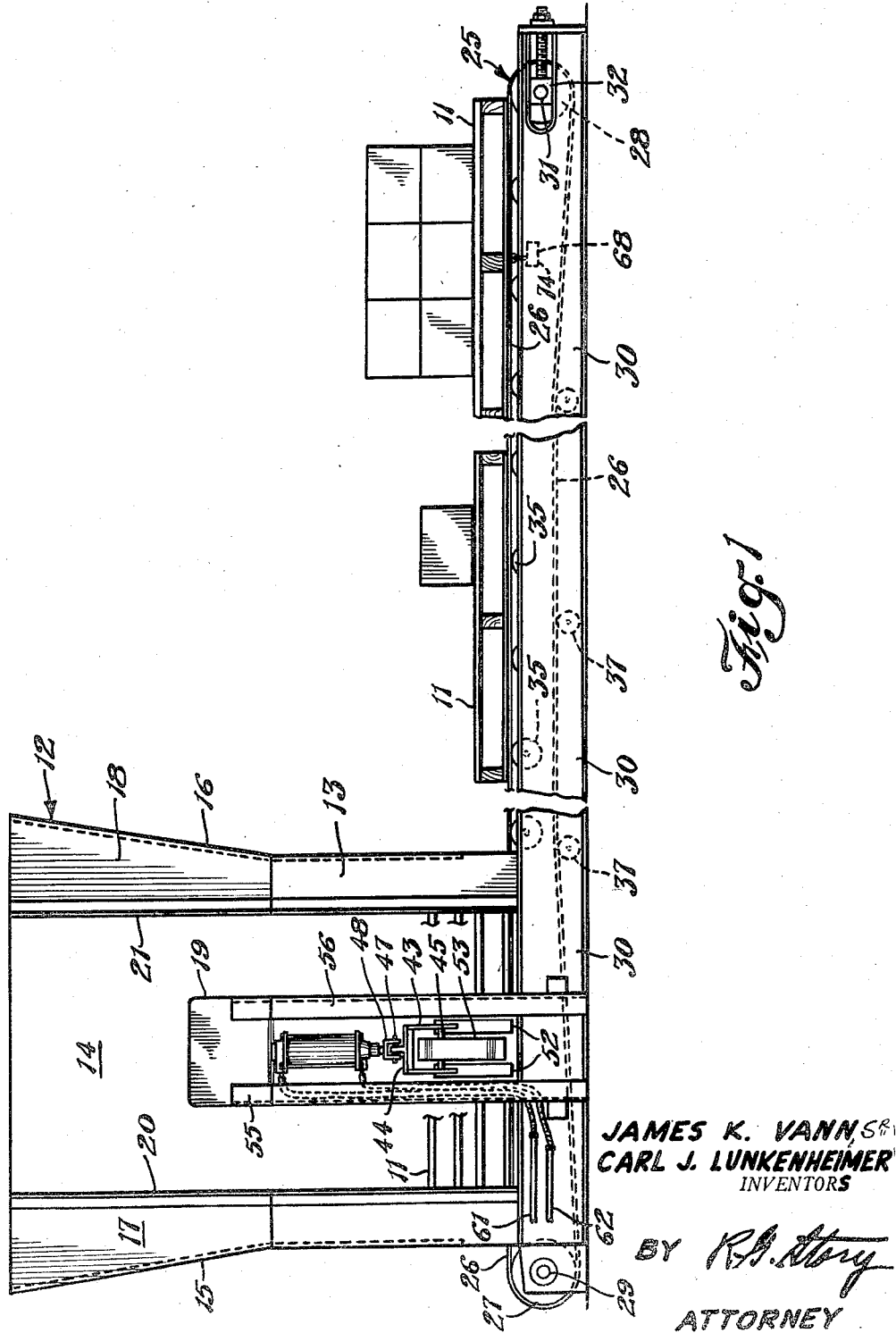
Figure 1 is a front elevation of the apparatus showing the pallet hopper, one lifting fork and the conveyor extending from the bottom of the hopper past a loading station to a discharge point.
Figure 2:
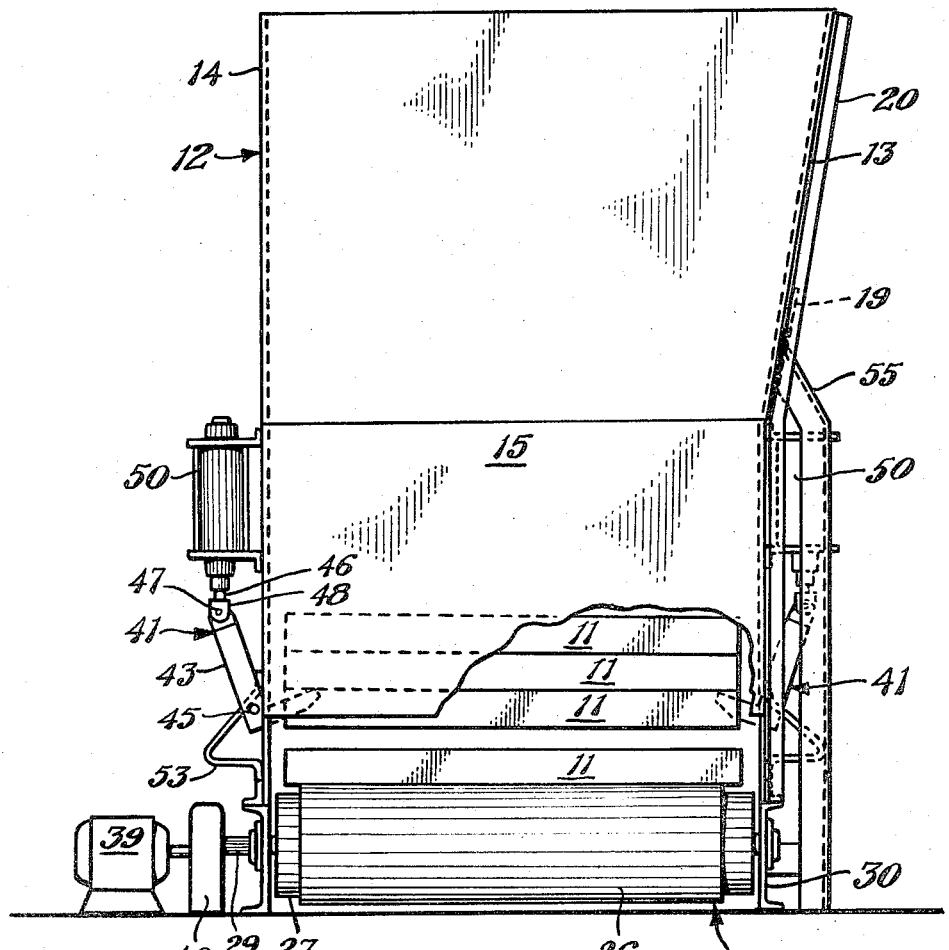
Figure 2 is a side elevation of the apparatus in Fig. 1, showing both forks in the up position supporting a stack of pallets.

In the embodiment of this invention illustrated in Figures 1–5, the numeral 11 represents a pallet of the type to be handled by this apparatus. A plurality of these pallets are maintained in a vertical stack within a hopper 12 having front 13, rear 14, left end 15, and right end 16 walls (as viewed in Fig. 1). The front and end walls are bent outwardly along their upper portions to form a flared opening at the top of the hopper. The front of the hopper is preferably formed of three parts, namely two side pieces 17 and 18, joined to the left and right ends respectively, and a vertical plate 19 spaced between and coplanar with side pieces 17, 18. Thus a vertical opening is provided in the front of the hopper which will permit the tines of a fork lift truck to be lowered while extending into the hopper and thus facilitate placing an entire stack of pallets therein. Side pieces 17 and 18 are provided with strengthening ribs 20 and 21, respectively, along their inner or free edges.

An endless conveyor generally 25 extends across the bottom of the hopper 12 and passes through openings in the bottom of the end walls. The conveyor comprises a belt 26 extending between a drive pulley 27 and a tail pulley 28. Drive pulley 27 is secured to axle 29 journaled in a frame 30. The tail pulley 28 is mounted on an axle 31 which is journaled in a pair of take up assemblies 32. These take up assemblies are adjustably mounted to the sides of the frame 30 and allow the belt 26 to be tightened to remove slack. The upper run of the belt 26 rests upon a plurality of conveyor rolls 35 journaled in the sides of the frame. A plurality of idler rolls 37, also journaled in the frame, support the lower run of the conveyor belt 26. An electric motor 39 is coupled to the drive pulley axle 29 in a conventional manner such as through a gear box 40.

Figure 3:
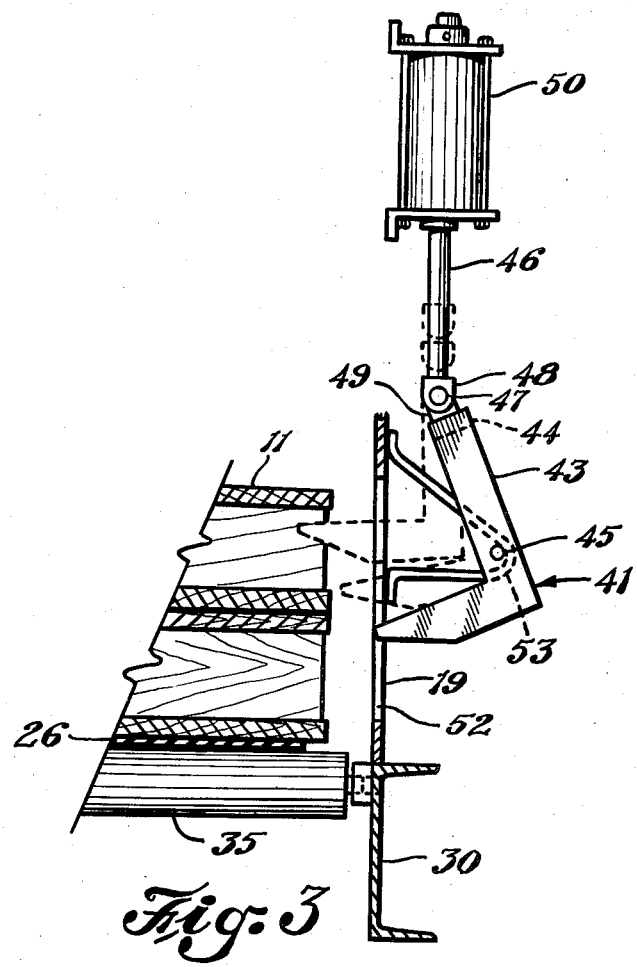
Figure 3 illustrates a single lifting mechanism including the fork, air cylinder, and guide track. Various attitudes assumed by the fork in cooperation with the guide are shown in phantom.

The pallets in hopper 12 are normally supported on the ends of lifting forks 41. These forks are positioned on the outside of hopper 12 above and at opposite sides of the conveyor 25. Each fork comprises a pair of identical right angle tines 43 joined by crossbar 44 and tie rod 45. It will be seen that due to the shape of the tines, the center of gravity of the fork 41 will be somewhere to the left of a line extending between bar 44 and the tie rod 45 (as seen in Fig. 3). The fork is pivotally secured to a piston rod 46 by means of a pin 47 inserted through a bifurcated end 48 of the piston rod and a lug 49 on the crossbar 44. The piston rod extends into an air cylinder 50 and is secured to a piston (not shown) therein. The tines 43 of the forks extend into the hopper through vertical slots 52 and are movable vertically therein. A guide track 53 is positioned between slots 52 and secured at both ends to the hopper wall. The tie rod 45 extends through the space defined by the wall of the hopper and the guide track. Thus it may be seen that any movement of forks 41 will be limited by the hopper 12 and guide track 53 which limit the path of tie rod 45.

Figure 5:
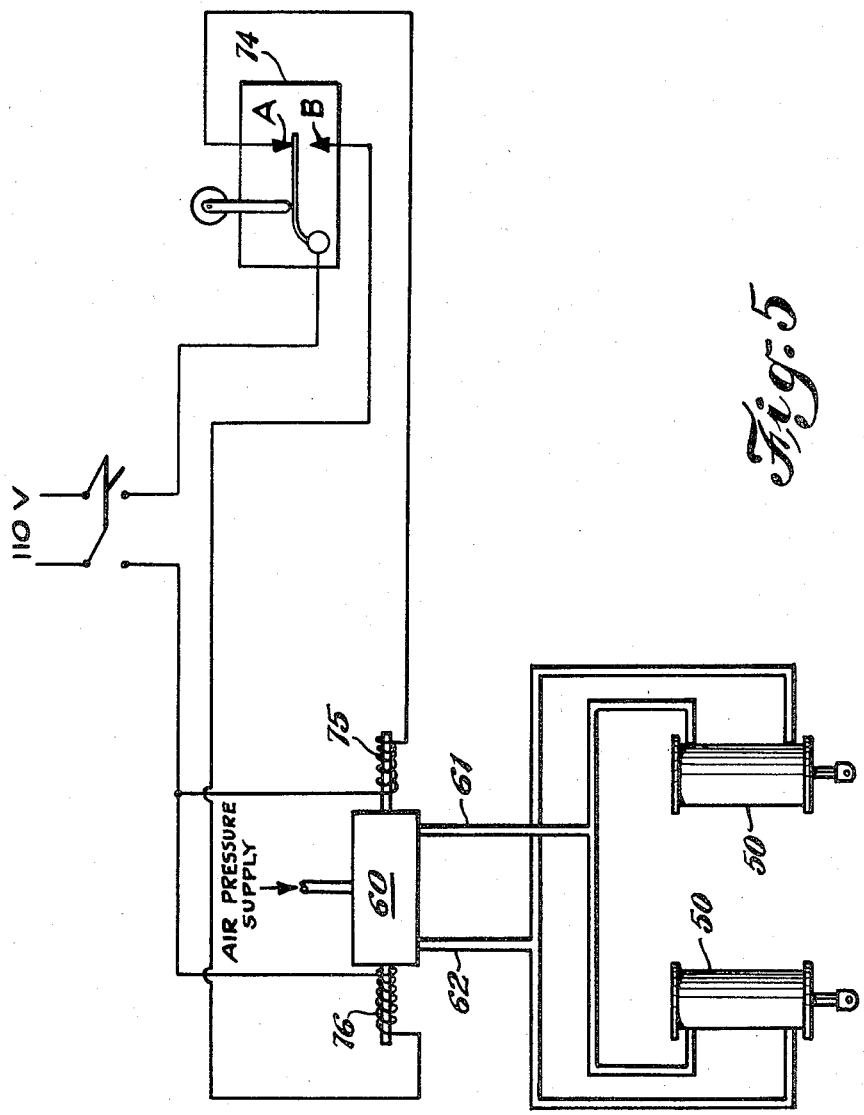
Figure 5 shows the electrical wiring for the automatic control of the lifting forks and also shows the four-way air valve and the pneumatic circuit.

The air cylinders 50 are secured to the vertical plate 19 and the rear 14 of hopper 12 above the slots 52 and are connected, in parallel, to a source of air under pressure (not shown) by means of a four-way solenoid operated air valve 60 (shown only in Fig. 5). An air line 61 connects one side of the air valve 60 to the upper ends of the air cylinders; and another air line 62 is connected to the lower ends of the air cylinders.

A pair of guard rails 55, 56 are secured to the top of the vertical plate 19 and extend outwardly and downwardly about air cylinder 50 and lifting fork 41. In this way, the air cylinder and fork will be protected from damage which might be incurred when pallets are being lowered into the hopper by means of a fork lift truck.

Figure 4:
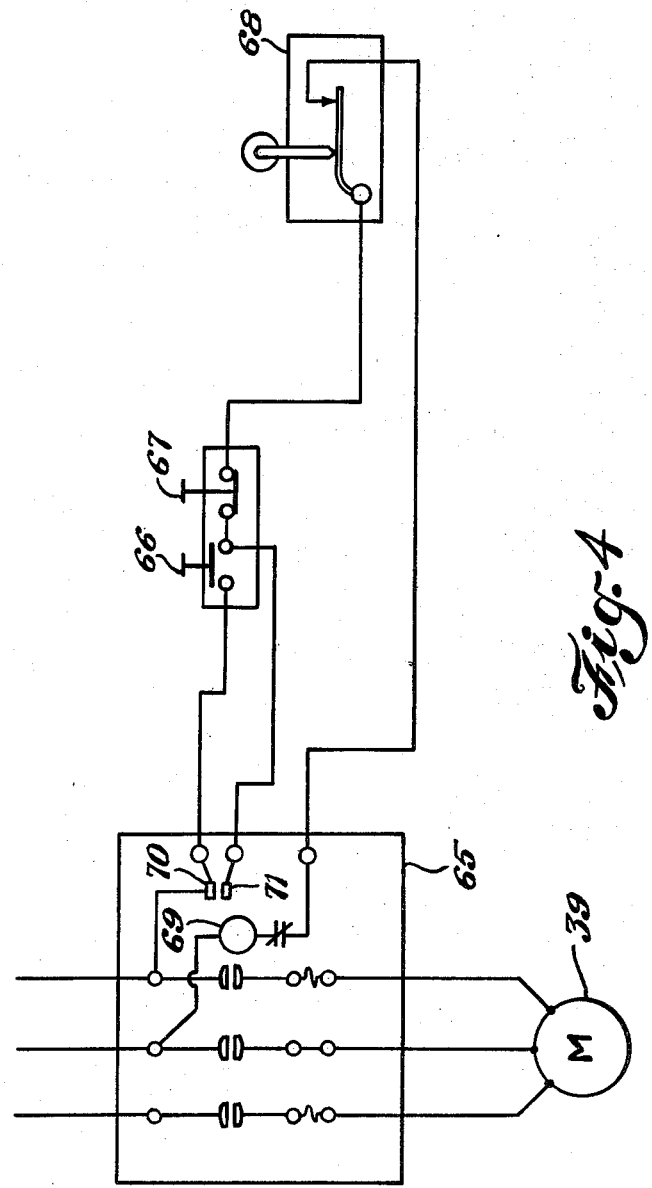
Figure 4 is a wiring diagram for the conveyor motor.

Figures 4 and 5 illustrate the electrical circuits provided to automatically control this apparatus. Figure 4 shows the conveyor motor control circuit comprising a magnetic motor starter 65 with a starting and stopping control circuit, and the electric motor 39. The starting-stopping circuit includes a manually operable start-switch 66 connected in series with a manual stop-switch 67 and a single throw snap switch 68. Both the manual stop-switch and the snap-switch are biased to closed positions and the starting circuit is connected across two lines of a three-phase power supply. The starting switch 66 is biased to the open position, and when this switch is manually closed current will flow through the starting circuit and energize a coil 69 which causes the magnetic motor starter to close and direct current to the electric motor 39. At the same time, contact points 70 and 71 in the starter circuit will be closed and current will by-pass the start-switch 66 and flow across the normally closed stop-switch 67 and snap-switch 68. Therefore, when the starting switch is released and moves to the open position, current will continue to flow through the starting circuit keeping the coil 69 energized and thus keeping the magnetic motor starter closed. The motor starter 65 will open and break the power circuit when either the manual stop-switch or the snap-switch is opened. The snap-switch 68 is preferably located adjacent the conveyor 25 near the tail pulley 28 where it will be tripped to the open position by a pallet near the end of the conveyor 25. So long as the snap-switch remains open, the motor 39 cannot be energized and, therefore, while a pallet remains at the end of conveyor 25, holding switch 68 open, the conveyor cannot be restarted. Also, switch 67 may be opened manually and the conveyor will stop regardless of the position of the pallet.

A double throw snap-switch 74 is located at approximately the same position, with regard to conveyor 25, as the conveyor motor control snap-switch 68. As may be best seen in Fig. 5, snap-switch 74 is normally closed in position "A" connecting a solenoid 75 on the right side of the four-way air valve 60 to a 110 volt power supply. The four-way valve will move to connect air line 62 (to the lower end of the air cylinder) with a supply of air under pressure such as a plant pressure system. Thus, when snap-switch 74 is in position "A" the lower ends of the air cylinders 50 will be under pressure and the forks 41 will hold the stacked pallets above conveyor 25. When switch 74 is thrown into position "B," solenoid 75 will be de-energized and a solenoid 76, on the left side of the four-way valve (as seen in Fig. 5), will be energized. Thus, when switch 74 is moved to position "B" the four-way valve will connect air line 61 and the upper ends of the cylinder 50 to the source of air under pressure and forks 41 will be lowered.

In operation, when the air pressure in cylinders 50 force the piston rod 46 up or down, the tie rod 45 will follow a path between guide track 53 and the wall of hopper 12. Thus (as illustrated in Fig. 3) as the fork 41 is moved upwardly the guide track will force it to move inwardly into engagement with pallets stacked within hopper 12. The guide tracks 53 are so positioned that this movement will cause the forks to engage the stack at the next to the lowest pallet within the hopper and lift the stack a short distance above the lowest pallet resting on conveyor belt 26. When the pressure in cylinders 50 is reversed and the forks move downwardly the tie rods 45 will move clear of guide tracks 53. When the weight of the pallets is transferred from the forks 41 to the conveyor 25, the forks will swing free of the pallets as the center of gravity of each lifting fork 41 will tend to align itself vertically with the pins 47. Obviously, the forks could also be spring loaded away from the hopper and pallets.

Snap switches 68 and 74 controlling the motor circuit and the air cylinder circuit, respectively, are positioned at essentially the same location near the end of conveyor 25. When switch 68 is in its normally closed position, the motor 39 will be energized causing conveyor 25 to move; also, when switch 74 is in its normal position "A," air under pressure is directed to the lower end of the air cylinders 50, thus maintaining the forks 41 in the raised position. Thus, when both switches 68 and 74 are in their normally closed positions the stack of pallets will be held above the conveyor 25 and any pallet resting on belt 26 will be carried out of the hopper toward the switches at the end of the conveyor. When a pallet reaches the end of the conveyor it will trip both switches 68 and 74 to simultaneously stop the conveyor and lower the stack of pallets onto the conveyor (at which time the forks will swing free of the pallets but remain in the lower position). The entire apparatus will remain arrested in this attitude until the pallet is lifted from switches 68 and 74, at which time switch 74 will move back to position "A" causing air under pressure to be directed to the lower side of cylinders 50. The fork 41 then lifts the stack of pallets from the conveyor. However, the conveyor will not move until it is restarted by manually operating the starting switch 66.

In the preferred embodiment of this invention, the station where the empty pallets are loaded is located midway between the hopper 12 and switches 68 and 74 at the end of the conveyor 25. After operation of the apparatus has commenced the stop-switch 67 is opened to stop the conveyor 25 when the first pallet leaving hopper 12 arrives at the loading station. The pallet is then loaded and the conveyor restarted by momentarily closing starting switch 66. When the loaded pallet trips switches 68 and 74, the conveyor again stops and the stack of pallets in hopper 12 is lowered onto the conveyor. At this time, an additional pallet is placed on the then empty conveyor at the loading station and loaded. When the loaded pallet at the end of the conveyor is removed the forks 41 lift all but one pallet of the stack in hopper 12 from the conveyor and the cycle may be restarted. Since the distance between the hopper to the loading station is equal to the distance between the loading station and switches 68 and 74, in subsequent operation of the apparatus, a pallet will automatically stop at the loading station when a loaded pallet trips switches 68 and 74.

The foregoing description of a specific embodiment is for the purpose of complying with 35 U.S.C. 112 and we wish it to be understood that we do not desire to be limited to the exact details of construction shown and described for obvious modifications will occur to a person skilled in the art.

We claim:

1. In a pallet feeding device, the combination of: a vertical hopper for maintaining a stack of pallets; an intermittently operable endless conveyor disposed beneath said hopper adapted to support the stack of pallets when said conveyor is at rest; a pair of rods mounted for vertical reciprocation on two opposite sides of the hopper; a pair of forks pivotally secured to the lower ends of said rods and extending into said hopper above the conveyor; means connected to the rods at the ends opposite the forks to reciprocate said rods; guide rails positioned at the sides of the hopper in the path of said forks adapted to urge the forks to pivot into supporting engagement with the next to the lowest pallet in the stack on said conveyor when said rods are reciprocated upwardly whereby the remainder of the stack of pallets will be lifted a distance above the lowest pallet; and actuating means to synchronize the operation of the conveyor with the upward reciprocation of said rod.

2. In a destacking apparatus including a hopper for stacked articles, a conveyor for removing single articles, and lifting means to lift the stack above the lowest article, the improvement in said lifting means comprising: a pair of pneumatic cylinders mounted on two opposing sides of the hopper; piston rods connected to said cylinders and disposed vertically above the conveyor; forks pivotally connected to the lower end of each of said rods whereby said forks may be pivoted into engagement with the under surface of an article within the hopper, said forks normally tending to withdraw from engagement with the article; guide rails attached to said sides of the hopper and confining the movement of said forks to a predetermined path whereby said forks will be pivoted into engagement with the article when said piston rods are moved upwardly and will be free to withdraw from engagement with the articles when said rods are moved downwardly; a source of air under pressure connected to each end of said pneumatic cylinders; and valve means connected between said cylinder and said source of air under pressure operable to direct the air under pressure to said cylinders so as to cause said pistons to reciprocate.

3. In a pallet feeding device including a vertical hopper for maintaining a stack of pallets, the improvement comprising: intermittently operable conveyor means disposed beneath the hopper; vertically reciprocable means disposed upon two opposite sides of the hopper; forks pivotably secured to said reciprocable means and extending into the hopper above said conveyor, said forks adapted to normally pivot away from the stack of pallets; guide means associated with each fork adapted to pivot said forks into engagement with the next to the lowest pallet in the stack on said conveyor as said reciprocable means moves upwardly, whereby the remainder of the stack of pallets will be lifted a distance above the lowest pallet; means connected to actuate said reciprocable means; and further means connected to actuate said conveyor means.

4. In a pallet feeding device including a vertical hopper for maintaining a stack of pallets the improvement comprising: an endless conveyor operable between the hopper and a point spaced therefrom; power means connected to said conveyor, said means adapted to cause said conveyor to operate upon receiving an appropriate signal; vertically reciprocable means disposed upon two opposite sides of the hopper; forks pivotably secured to said reciprocable means and extending into said hopper above the conveyor, said forks adapted to normally pivot away from the stack of pallets; guide means associated with each fork adapted to pivot the forks into engagement with the next to the lowest pallet in the stack on said conveyor as said reciprocable means moves upwardly whereby the remainder of the stack of pallets will be lifted a distance above the lowest pallet; sensing means located adjacent said conveyor at said point in the path of said pallets connected to said power means to stop said conveyor; and further means located adjacent said conveyor at said point connected to actuate said reciprocable means whereby the forks will be caused to lower the remainder of the stack when a pallet reaches said point and to lift the remainder of the stack when said aforementioned pallet is removed from said point.

References Cited in the file of this patent

UNITED STATES PATENTS

| | | |
|---|---|---|
| 630,187 | Cunningham | Aug. 1, 1899 |
| 994,115 | Boucher | June 6, 1911 |
| 2,108,457 | Tobia | Feb. 15, 1938 |
| 2,447,959 | Phillips et al. | Aug. 24, 1948 |
| 2,702,132 | Van Doren | Feb. 15, 1955 |
| 2,731,131 | Shannon | Jan. 17, 1956 |

FOREIGN PATENTS

| | | |
|---|---|---|
| 155,225 | Australia | Feb. 11, 1954 |